United States Patent
Jessen

(10) Patent No.: US 7,032,694 B2
(45) Date of Patent: Apr. 25, 2006

(54) PROPULSION SULKY

(76) Inventor: Thomas F. Jessen, 855 Harrison Blvd., Valparaiso, IN (US) 46383

( * ) Notice: Subject to any disclaimer, the term of this patent is extended or adjusted under 35 U.S.C. 154(b) by 3 days.

(21) Appl. No.: 10/710,138

(22) Filed: Jun. 22, 2004

(65) Prior Publication Data

US 2004/0262052 A1    Dec. 30, 2004

Related U.S. Application Data

(60) Provisional application No. 60/481,017, filed on Jun. 24, 2003.

(51) Int. Cl.
*B62D 51/02* (2006.01)
(52) U.S. Cl. .................. 180/19.1; 180/14.2; 180/11
(58) Field of Classification Search .............. 180/19, 180/14.2, 11
See application file for complete search history.

(56) References Cited

U.S. PATENT DOCUMENTS

| | | | | |
|---|---|---|---|---|
| 3,485,314 A | * | 12/1969 | Herr | 180/19.1 |
| 5,564,721 A | * | 10/1996 | Wians | 280/32.7 |
| 6,059,055 A | * | 5/2000 | Velke et al. | 180/19.1 |
| 6,871,714 B1 | * | 3/2005 | Johnson | 180/19.2 |

* cited by examiner

*Primary Examiner*—Lesley D. Morris
*Assistant Examiner*—Marlon Arce-Diaz
(74) *Attorney, Agent, or Firm*—Gary M. Hartman; Domenica N.S. Hartman; Hartman & Hartman

(57) ABSTRACT

A self-propelled sulky for attachment to existing non-self-propelled equipment, thereby enabling the equipment to be converted into a self-propelled equipment with a modular propulsion system. The sulky includes a frame, a motor mounted to the frame, wheels rotatably mounted to the frame, a device for transferring power from the motor to at least one of the wheels, a device for controlling the power transferring device and thereby the ground speed and direction of the sulky, a device for connecting the sulky to a rearward end of the non-self-propelled equipment to enable pushing of the non-self-propelled equipment with the sulky, and a support structure on the frame for supporting an operator in a standing position. The support structure is located and configured on the frame to enable the operator to selectively step onto the support structure to ride the sulky and step off the support structure to walk behind the sulky.

20 Claims, 2 Drawing Sheets

PROPULSION SULKY

CROSS REFERENCE TO RELATED APPLICATIONS

This application claims the benefit of U.S. Provisional Application No. 60/481,017, filed Jun. 24, 2003.

BACKGROUND OF INVENTION

1. Field of the Invention

The present invention generally relates to equipment that must be propelled across the ground, such as lawn and garden equipment. More particularly, this invention relates to a self-propelled sulky that is configured for attachment behind equipment and propelling the equipment across the ground, and further configured to permit the operator to selectively stand on or walk behind the sulky.

2. Description of the Related Art

Many devices have been developed in the lawn care field that require an operator to push or pull them. Spreaders, sprayers, mowers, and dump carts are only a few examples. These devices may be heavy and difficult to push, especially over uneven ground. Accordingly, efforts have been made to develop self-propelled versions of non-self-propelled lawn care equipment. For example, U.S. Pat. No. 5,333,597 to Jessen discloses an add-on drive system for a spreader, yielding a self-propelled spreader that reduces the effort required by an operator to apply materials to a lawn or garden. While Jessen's spreader lacks a platform that would allow the operator to ride on the unit, U.S. Pat. No. 6,336,600 to Jessen discloses a self-propelled fertilizer spreader behind which a sulky is towed that permits the operator to selectively walk behind or stand on the sulky during operation of the spreader.

Though the advancements taught by Jessen are versatile and significantly reduce the effort required by an operator to apply materials to a lawn or garden, further improvements in self-propelled lawn and garden equipment would be desirable, particularly regarding propulsion drive systems for non-self-propelled equipment.

SUMMARY OF INVENTION

The present invention provides a self-propelled sulky for attachment to existing non-self-propelled equipment, thereby enabling the equipment to be converted into a self-propelled equipment with a modular propulsion system. The sulky is configured to permit an operator to selectively ride on or walk behind the sulky and enable the operator to maneuver the equipment with the sulky.

The sulky includes a frame having forward and rearward portions, a motor mounted to the frame, wheels rotatably mounted to the frame, means for transferring power from the motor to at least one of the wheels, means for controlling the power transferring means and thereby the ground speed and direction of the sulky, means for connecting the sulky to a rearward end of a non-self-propelled device to enable pushing of the non-self-propelled device with the sulky, and means on the frame for supporting an operator in a standing position. According to the invention, the supporting means is located and configured on the frame to enable the operator to selectively step onto the supporting means and ride the sulky and to step off the supporting means to walk behind the sulky, such as during operation of the sulky in combination with the non-self-propelled device.

In view of the above, it can be seen that a significant advantage of this invention is that it provides a propulsion system incorporated into a sulky configured to permit an operator of a non-self-propelled device to selectively ride on the sulky or walk behind the sulky during otherwise normal operation of the device. The sulky can be retrofitted in the field or installed as a permanent or temporary part of a non-self-propelled device at the time of construction. The sulky is preferably capable of propelling a non-self-propelled device in forward or backward directions while permitting normal steering of the non-self-propelled device and operation of its control features.

Other objects and advantages of this invention will be better appreciated from the following detailed description.

DETAILED DESCRIPTION

Figure 1:
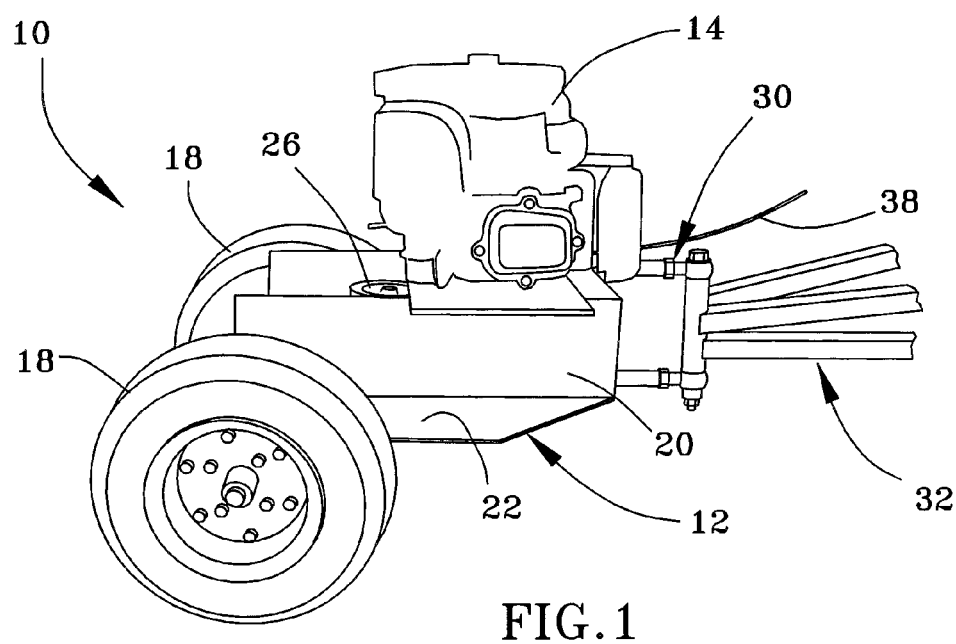
FIGS. 1 and 2 are side and rear views of a self-propelled sulky adapted for attachment to lawn and garden equipment in accordance with a preferred embodiment of this invention.
Figure 2:
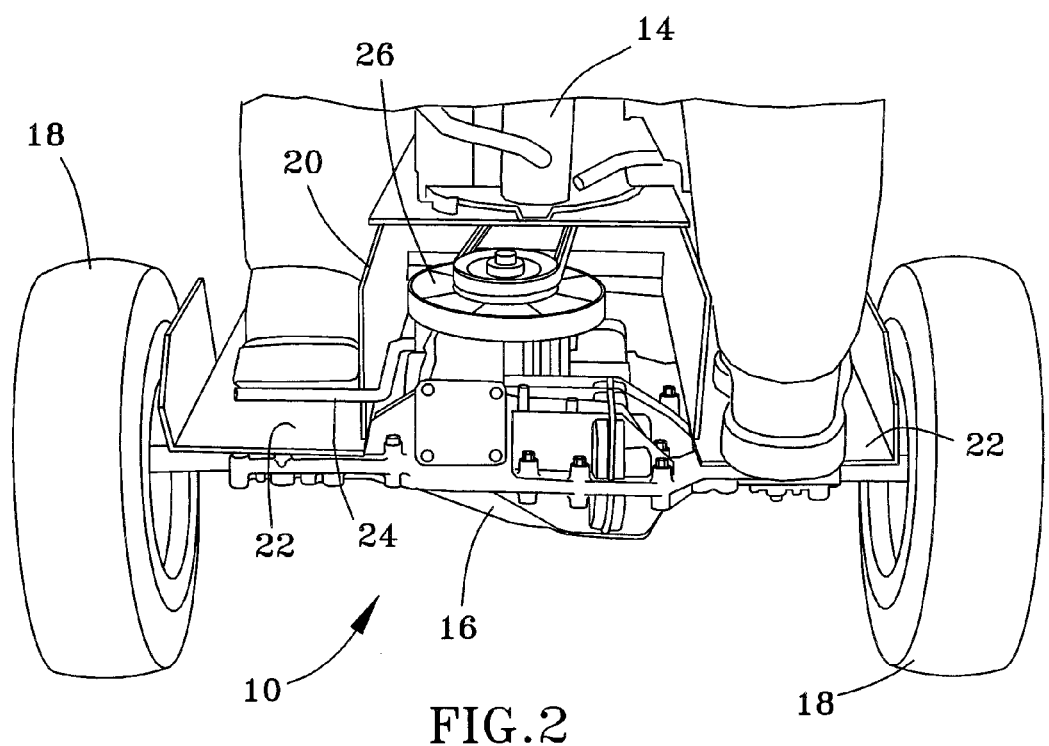

Illustrated in FIGS. 1 and 2 is a propulsion sulky 10 in accordance with a preferred embodiment of this invention. The propulsion sulky 10 is shown as including a motor 14 mounted to a forward portion of a chassis frame 12. The frame 12 can be formed of metal or another suitable material. The motor 14 can be of any suitable type, such as a four-cycle gasoline engine or a battery-powered electric motor. Accessories of the motor 14, including a fuel reservoir, starter, throttle, etc., are also preferably mounted to the frame 12. A transaxle 16 is mounted to the frame 12 and drives a pair of drive wheels 18 located on opposite sides of the frame 12 and toward the rear of the frame 12. The frame 12 includes a housing 20 in which the transaxle 16 is located, and a pair of platforms 22 separated by the housing 20 and located between the housing 20 and each of the wheels 18. As evident from FIG. 1 and as seen in FIG. 2, the platforms 22 are adapted to permit an operator to stand on the propulsion sulky 10. The platforms 22 can be equipped with a non-skid surface to improve traction of the operator's footwear. While shown as being between and extending forward of the wheels 18, the platforms 22 could be located or extend rearward of the wheels 18. A seat (not shown) may be attached to the rear of the frame 12 to permit the operator to sit while operating the sulky 10.

The transaxle 16 is preferably hydrostatically operated, providing multiple forward speeds, at least one reverse speed, neutral, and a differential. According to a preferred aspect of the invention, the transaxle 16 is operated by a foot-operated lever 24 coupled to the valve system (not shown) of the transaxle 16 to regulate the speed and direction of rotation of the drive axles (not shown) of the transaxle 16. As seen in FIG. 2, the foot-operated lever 24 extends from the back of the housing 20, and is positioned over one of the platforms 22 to permit operation of the lever 24 with the operator's heel. The transaxle 16 is driven by the motor 14 through a suitable drive system, preferably a belt-and-pulley system 26 depicted in FIG. 2. A centrifugal clutch of a type known in the art preferably interconnects the drive belt with the motor output shaft, permitting engagement and disengagement of the clutch by increasing and decreasing, respectively, the speed of the motor 14. In this manner, a second foot-operated lever (not shown) located on, for example, the other platform 22, or an optional hand-operated lever mounted elsewhere, can be used to operate the motor throttle (not shown) to control the engine speed as well as engage and disengage the clutch.

Figure 3:
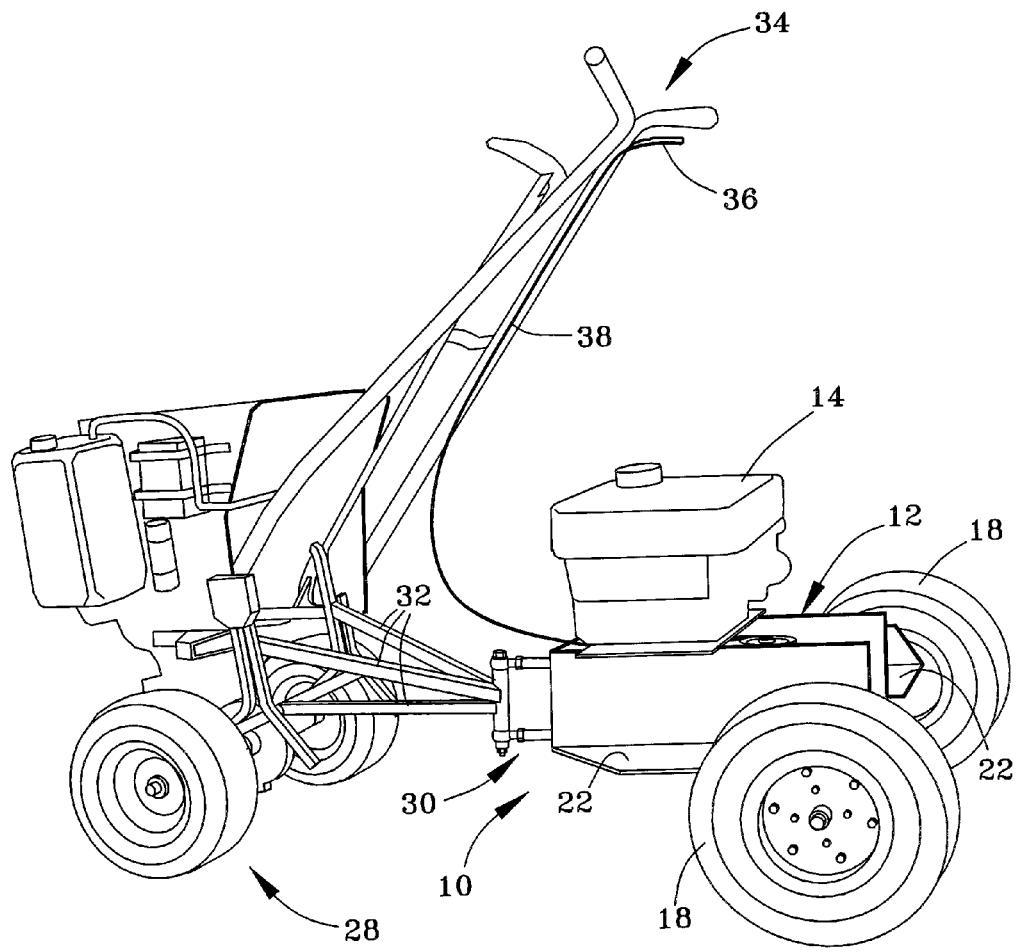
FIG. 3 shows the self-propelled sulky of FIGS. 1 and 2 coupled to a fertilizer spreader in accordance with this invention.

In FIG. 3, the front of the sulky 10 is shown connected to the rear of a non-self-propelled fertilizer spreader 28 with an articulating joint mechanism 30 of the type disclosed in U.S. Pat. No. 6,336,600 to Jessen, though other connection devices could foreseeably be used. In accordance with Jessen, the front of the articulating joint mechanism 30 can be attached with bolts or quick-release clevis pins to brackets 32 that are attached and extend from the rear of the spreader 28, facilitating rapid connection and disconnection of the articulating joint 30 to the spreader 28. In further accordance with Jessen, the joint mechanism 30 enables the sulky 10 to turn and twist relative to the spreader 28, thereby promoting the ability to maneuver the sulky-spreader combination during use. With the joint mechanism 30 shown in the Figures or an alternative attachment mechanism, the sulky 10 can be retrofitted in the field or installed as a permanent or temporary part of the spreader 28 or another non-self-propelled device at the time of construction. Those skilled in the art will appreciate that the brackets 32, which must be appropriately configured to securely attach to the rear of the spreader 28, must also be sufficiently strong and rigid to withstand the static loads that exist as a result of supporting the sulky 10 and spreader 28 relative to each other, as well as withstand the dynamic loads imposed during the operation and maneuvering of the sulky-spreader combination. Suitable configurations for the brackets 32 will depend on the type of equipment (e.g., spreader 10, sprayers, mowers, dump carts, etc.) to which the sulky 10 is to be attached for propelling.

In view of the above, the sulky 10 is capable of propelling the spreader 28 in both forward or backward directions through operation of the foot-operated lever 24. The spreader 28 is shown as being equipped with a conventional handle 34 with which the spreader 28 would be pushed if used without the sulky 10 of this invention. When the sulky 10 is attached to the spreader 28 as shown, the sulky 10 permits normal steering of the spreader 28 with the handle 34, as well as operation of the control features of the spreader 28. A hand-operated lever 36 of a type known in the art is shown as being installed on the handle 34 of the spreader 28, and a cable 38 interconnects the lever 36 to the valve system of the transaxle 16 or the throttle of the motor 14 to provide the operator with the option of operating the sulky 10 (e.g., ground speed and direction, engine speed) by hand or with the foot-operated lever(s) 24 of the sulky 10. According to a preferred embodiment of the invention, the sulky 10 is equipped with the foot-operated lever 24 located on one of the platforms 22 for operating the valve system of the transaxle 16, and the hand-operated lever 36 operates the motor throttle to control the engine speed, including engagement and disengagement of the clutch. Such an option permits the operator to control and operate the sulky 10 and spreader 28 from a walking position behind the sulky 10. For this reason, the sulky 10 is preferably sufficiently compact to permit the operator to comfortably reach the handle 34 of the spreader 28 while walking behind the sulky 10. In FIG. 3, the sulky 10 is sufficiently compact to be positioned below the handle 34 of the spreader 28 when attached to the spreader 28 with the joint mechanism 30. Alternatively or in addition, and depending on the type of equipment being propelled by the sulky 10, the handle 34 could be modified to have a suitable configuration that permits the operator to comfortably reach the handle 34 while walking behind the sulky 10.

While the invention has been described in the terms of a preferred embodiment, it is apparent that one skilled in the art could adopt other forms. For example, the sulky of this invention could be adapted for use with non-self-propelled equipment other than those associated with the lawn and garden care field. Furthermore, from the foregoing it will be appreciated that the transaxle 16 (or another other suitable transmission means) and the clutch and/or throttle (or another other suitable clutching means and/or throttle means) of the sulky 10 can be operated with one or more foot-operated levers (e.g., lever 24) and/or one or more hand-operated levers (e.g., lever 36). Accordingly, the scope of the invention is to be limited only by the following claims.

The invention claimed is:

1. A self-propelled sulky for coupling to a rearward end of a non-self-propelled device having a handle that extends over the sulky when the non-self-propelled device is coupled to the sulky, the sulky comprising:
   a frame having a forward portion and a rearward portion;
   a motor mounted to the frame;
   wheels rotatably mounted to the frame;
   means for transferring power from the motor to at least one of the wheels;
   means for controlling the power transferring means and thereby the speed and direction of the sulky;
   means for connecting the sulky to the rearward end of the non-self-propelled device to enable pushing of the non-self-propelled device with the sulky; and
   means on the frame for supporting an operator in a standing position, the supporting means being located and configured on the frame to enable the operator to selectively step onto the supporting means to ride the sulky and to step off the supporting means to walk behind the sulky;
   wherein the sulky is configured for steering of the non-self-propelled device with the handle thereof when the non-self-propelled device is coupled to the sulky.

2. A self-propelled sulky according to claim 1, wherein the connecting means is an articulating joint mechanism.

3. A self-propelled sulky according to claim 2, wherein the connecting means is configured for quick connection and disconnection of the sulky from the non-self-propelled device.

4. A self-propelled sulky according to claim 1, wherein the connecting means is located at the forward portion of the frame.

5. A self-propelled sulky according to claim 1, wherein the supporting means is located at the rearward portion of the frame.

6. A self-propelled sulky according to claim 1, wherein the supporting means is located between the wheels.

7. A self-propelled sulky according to claim 1, wherein the supporting means comprises two spaced-apart platforms.

8. A self-propelled sulky according to claim 1, wherein the controlling means comprises a foot-operated lever located on the supporting means.

9. A self-propelled sulky according to claim 1, wherein the controlling means comprises a hand-operated lever that is not located on the sulky and is configured for installation on the handle of the non-self-propelled device.

10. A self-propelled sulky according to claim 9, wherein the sulky is connected with the connecting means to the non-self-propelled device, and the hand-operated lever is located on the handle of the non-self-propelled device.

11. A self-propelled sulky according to claim 10, wherein the handle of the non-self-propelled device extends sufficiently over the sulky to enable the operator to steer the non-self-propelled device with the handle thereof and operate the hand-operated lever while the operator walks behind the sulky.

12. A self-propelled sulky comprising:
a frame having a forward portion and a rearward portion;
a motor mounted to the frame;
wheels rotatably mounted to the frame;
means for transferring power from the motor to at least one of the wheels;
means for controlling the power transferring means and thereby the speed and direction of the sulky;
means for connecting the sulky to a rearward end of a non-self-propelled lawn/garden equipment to enable pushing of the non-self-propelled lawn/garden equipment with the sulky; and
means on the frame for supporting an operator in a standing position, the supporting means being located and configured on the frame to enable the operator to selectively step onto the supporting means to ride the sulky and to step off the supporting means to walk behind the sulky.

13. A self-propelled sulky according to claim 12, wherein the non-self-propelled lawn/garden equipment is a fertilizer spreader.

14. A self-propelled sulky coupled to a rearward end of a non-self-propelled lawn/garden equipment having a handle that extends over the sulky, the sulky comprising:
a frame having a forward portion, a rearward portion, and oppositely-disposed side portions;
a motor mounted to the frame;
a pair of wheels rotatably mounted to the frame at the side portions thereof;
means for transferring power from the motor to at least one of the wheels;
means for connecting the sulky to the rearward end of the non-self-propelled lawn/garden equipment to enable pushing of the non-self-propelled lawn/garden equipment with the sulky;
first and second platforms spaced apart and located at the rearward portion of the frame for supporting an operator in a standing position, the first and second platforms being located and configured to enable the operator to steer the non-self-propelled lawn/garden equipment with the handle thereof, and to selectively step onto the first and second platforms to ride the sulky and step off the first and second platforms to walk behind the sulky during operation of the sulky; and
means for controlling the power transferring means and thereby the speed and direction of the sulky, the controlling means comprising a foot-operated lever located on at least one of the first and second platforms.

15. A self-propelled sulky according to claim 14, wherein the connecting means is an articulating joint mechanism located at the forward portion of the frame and configured for quick connection and disconnection of the sulky from the non-self-propelled lawn/garden equipment.

16. A self-propelled sulky according to claim 14, wherein the first and second platforms are located between the wheels.

17. A self-propelled sulky according to claim 14, wherein the power transferring means is mounted to the frame between the first and second platforms.

18. A self-propelled sulky according to claim 14, wherein the controlling means further comprises a hand-operated lever located on the handle of the non-self-propelled lawn/garden equipment.

19. A self-propelled sulky according to claim 18, wherein the handle of the non-self-propelled lawn/garden equipment extends sufficiently over the sulky to permit operation of the hand-operated lever by the operator while the operator walks behind the sulky.

20. A self-propelled sulky according to claim 14, wherein the non-self-propelled lawn/garden equipment is a fertilizer spreader.

* * * * *